(12) United States Patent
Walterscheid et al.

(10) Patent No.: US 6,896,298 B2
(45) Date of Patent: May 24, 2005

(54) CONDUIT COUPLING ASSEMBLY

(75) Inventors: Wade J. Walterscheid, Rosston, TX (US); Terry David Manuel, The Colony, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 10/632,424

(22) Filed: Aug. 1, 2003

(65) Prior Publication Data

US 2005/0023827 A1 Feb. 3, 2005

(51) Int. Cl.⁷ ............................................... F16L 39/00
(52) U.S. Cl. .................. 285/205; 285/124.3; 285/124.5
(58) Field of Search ............................. 285/374, 124.4, 285/124.5, 124.3, 124.2, 124.1, 137.11, 208, 206, 205

(56) References Cited

U.S. PATENT DOCUMENTS

| | | |
|---|---|---|
| 1,892,781 A | 1/1933 | Hoenstine |
| 2,475,468 A | 7/1949 | Andrews |
| 2,983,506 A | 5/1961 | Bertsch et al. |
| 3,092,404 A | 6/1963 | MacWilliam |
| 3,393,930 A | 7/1968 | Ziherl et al. |
| 3,751,002 A | 8/1973 | Folkerts et al. |
| 3,869,152 A | 3/1975 | DeVincent et al. |
| 3,869,153 A | 3/1975 | DeVincent et al. |
| 3,874,710 A | 4/1975 | Courtot |
| 3,929,356 A | 12/1975 | DeVincent et al. |
| 4,468,054 A | 8/1984 | Orth |
| 4,575,134 A | 3/1986 | Sugano |
| 4,621,843 A | 11/1986 | Straub |
| 4,754,995 A | 7/1988 | Takahashi et al. |
| 4,805,944 A | 2/1989 | Reginaldo |
| 4,920,766 A | 5/1990 | Yamamoto et al. |
| 5,131,695 A | 7/1992 | Wiser |
| 5,146,766 A | 9/1992 | Martins |
| 5,271,646 A | 12/1993 | Allread et al. |
| 5,294,156 A | 3/1994 | Kumazaki et al. |
| 5,308,125 A | 5/1994 | Anderson, Jr. |
| 5,323,808 A | 6/1994 | Shimizu |
| 5,338,075 A | 8/1994 | Albrecht |
| 5,354,101 A | 10/1994 | Anderson, Jr. |
| 5,354,103 A | 10/1994 | Torrence et al. |
| 5,464,042 A | 11/1995 | Haunhorst |
| 5,467,611 A | 11/1995 | Cummings et al. |

(Continued)

FOREIGN PATENT DOCUMENTS

| | | |
|---|---|---|
| AT | 11139 | 3/1903 |
| GB | 328056 | 4/1930 |
| GB | 338462 | 11/1930 |

OTHER PUBLICATIONS

Component Standard 305, Fittings and Tubing Details for Mobile Air Conditioning Systems, International Mobile Air Conditioning Association (IMACA), Ft. Worth, Texas, Jan. 1997 (pp. 1–18).

*Primary Examiner*—David Bochna
(74) *Attorney, Agent, or Firm*—Sidley Austin Brown & Wood LLP

(57) ABSTRACT

A coupling assembly is provided such that a conduit having an annular bead and an annular seal can be slidably inserted into a specially formed port. The port is provided with a series of beveled surfaces that accommodate the seal in such a way that the conduit can be slidably inserted with a reduced risk of seal extrusion. An anchor plate is provided for bearing down on a side of the annular bead opposite the port in order to hold the conduit in place after insertion. The coupling assembly can include two or more conduits inserted into respective ports having the series of beveled surfaces. According to one embodiment, the port(s) also includes a counterbored surface at a depth of the port at or near where the end of the conduit reaches.

39 Claims, 5 Drawing Sheets

U.S. PATENT DOCUMENTS

| | | |
|---|---|---|
| 5,515,696 A | 5/1996 | Hutchison |
| 5,556,138 A | 9/1996 | Nakajima et al. |
| 5,603,152 A | 2/1997 | Le et al. |
| 5,820,167 A | 10/1998 | Linkner, Jr. |
| 5,887,612 A | 3/1999 | Bleitz et al. |
| 5,893,591 A | 4/1999 | Ebel et al. |
| 6,003,905 A | 12/1999 | Moffa et al. |
| 6,089,623 A | 7/2000 | Schroeder et al. |
| 6,189,333 B1 | 2/2001 | Cummings et al. |
| 6,382,678 B1 | 5/2002 | Field et al. |
| 6,386,593 B1 * | 5/2002 | Slais et al. ............... 285/124.1 |
| 6,398,269 B1 * | 6/2002 | Haussmann ................. 285/374 |
| 6,443,502 B1 * | 9/2002 | Iida et al. ................ 285/124.1 |
| 6,481,756 B1 | 11/2002 | Field et al. |
| 6,676,167 B2 * | 1/2004 | Schroeder et al. ....... 285/124.4 |

* cited by examiner

CONDUIT COUPLING ASSEMBLY

FIELD OF THE INVENTION

This invention relates in general to joints between two or more members, such members comprising a conduit, such as a fluid conducting pipe, tube or tubular body, and a mounting component, such as a plate or wall-like structure. In particular, the mounting component has a counterbore for receiving a portion of the conduit, and a packing material, such as a seal, is positioned in the counterbore area between the conduit and the mounting component when the joint is in an assembled state.

BACKGROUND OF THE INVENTION

Even before the advent of automobiles, air-cooling systems of sorts were available for vehicles such as horse-drawn carriages. One example was a system that involved placing ice blocks in a holder under a carriage where air, blown by a fan on the carriage axle, would move across the ice blocks towards the passengers.

Air cooling systems, better known as air conditioning (A/C) systems, for present day automobiles have become much more complex. Today's automotive air conditioning systems generally include an evaporator, a compressor, a condenser, and an expansion valve fluidly connected together by refrigerant lines. The compressor receives refrigerant at a low pressure as a vapor from the evaporator. The compressor then compresses the vaporous refrigerant to a higher pressure, and sends it to the condenser. The condenser cools and liquifies the refrigerant and sends it to the expansion valve. At the expansion valve, the pressure and temperature of the refrigerant drops, usually quite drastically. After the expansion valve, the cooled refrigerant returns to the evaporator where it evaporates, causing the surrounding space of the evaporator to be cooled. This cycle is continuously repeated as the A/C system is in operation.

In order to ease the serviceability of an automotive A/C system, it is desirable to ease the detachability of the refrigerant lines from the various system components. However, it is not desirable to allow the refrigerant to escape from within the A/C system, so particular attention should be given to ensuring that connections between refrigerant lines and the various system components are sufficiently sealed. One way that such connections have been made in the past is with pad-style fittings as illustrated in FIG. 5.

As shown in FIG. 5, two refrigerant lines 110 and 111 are connected to a component 116 of an A/C system, where, for example, line 110 can be an output line and line 111 can be an input line. The ends of lines 110 and 111 are engaged in respective ports 120 and 121 of the component 116, so as to penetrate through a face 117 of the component 116. Each of lines 110 and 111 includes a respective annular bead 122 and 123. An anchor plate 114 is provided, which bears on the annular beads 122 and 123 so as to compress respective o-ring seals 124 and 125 into respective annular seatings 126 and 127. The annular seatings 126 and 127 define respective terminal radial enlargements of the ports 120 and 121 adjacent to the face 117. A hex nut 118 fastened to a threaded stud 112 is provided for securing the anchor plate 114 against the beads 122 and 123.

Prior types of connectors such as the one described above are often referred to as pad-style IMACA (International Mobile Air Conditioning Association) 305 connectors. IMACA 305 is a standard for threaded connections such as the connector shown in FIG. 7. It will be noted that the connector in FIG. 7 includes a threaded swivel nut 130 that is not present in the pad-style connector shown in FIG. 5. Because the threaded swivel nut 130 must be threaded into the threaded female portion 132, these threaded connections are relatively cumbersome to assemble. Thus, the pad-style version of the IMACA 305 discussed above was developed to provide a connector that is less cumbersome to assemble, while at the same time maintaining IMACA 305 standard dimensions.

However, despite the increased ease with which the pad-style fittings can be assembled, they are known to suffer high failure rates. The connection failures in the pad-style connectors are very often caused by the seals not seating properly during assembly. This is a disadvantage of the pad-style connectors compared to the threaded connectors. On the threaded connectors, the threaded swivel nut acts as a pilot to align the parts, providing for the proper positioning of the seal. While the pad-style connectors are easier to assemble as a result of not having the threaded swivel nut, they also lack the piloting feature provided by the swivel nut. As a consequence, slight misalignments can occur when assembling a connector such as the one shown in FIG. 5, resulting in the seal not seating properly.

When a seal does not seat properly during assembly, a portion of the seal becomes extruded, or "pinched out" of position. An example of this is shown in FIG. 6, where an extrusion, designated generally as 128, of seal 124 can be seen due to the seal 124 becoming improperly seated during assembly. The seal 124 is held out of alignment due to the pressure of anchor plate 114 bearing down on the bead 122, which in turn bears down on the extruded portion 128 of seal 124, holding it between the bead 122 and the face 117. When this happens, the misaligned seal 124 can be difficult to visually detect due to visual obstructions, such as the anchor plate 114. Since the seal 124 is misaligned, a slow leak in the A/C system can result. Not only is a leak in the A/C system undesirable, but such leaks can be expensive and time-consuming to troubleshoot and repair, and can also have adverse environmental implications.

As a result of the problems with seals not seating properly with the pad-style connectors, alternative types of connectors have been developed in the art in an effort to provide a connector that is simple to assemble and reliable. This trend has led to the development of connectors that no longer adhere to the IMACA 305 geometry. As a result, such connectors tend to be considered more specialized from a manufacturing standpoint, and therefore require an increased amount of documenting and/or retooling as compared to connectors that comply with IMACA standard dimensions. Thus, the expense of such connectors tends to increase as well.

SUMMARY OF THE INVENTION

The present invention takes a novel approach to solving the problems associated with prior pad-style connectors. According to the present invention, a coupling assembly is provided which comprises a component of a system of any sort. The component has a surface with a port opening for a port which extends into the component. The port has first, second, and third diameters, which are at respective positions from closer to the face of the component to further from the face of the component (i.e., from closer to the port opening to further inside the port). The first diameter is larger than the second diameter, and the second diameter is larger than the third diameter. The port widens at a first angle between the second diameter and the first diameter, and the port widens at a second angle between the third diameter and the second diameter, the first angle being different than the second angle.

The coupling assembly also comprises a conduit having an annular bead. An end of the conduit is slidably inserted into the port such that the end of the conduit is beyond the position of the third diameter, and at least a portion of the annular bead is beyond the port opening. An annular seal is also provided, which extends around the conduit between the annular bead and the position of the third diameter.

The first angle is preferably in a range of 8.5 degrees to 15.5 degrees, and most preferably, the first angle is in a range from 11.5 degrees to 12.5 degrees. The second angle can be in a range 28–32 degrees, but this is not a critical range.

The port can have a fourth diameter, larger than the first diameter, located between the first diameter and the port opening. Then, the port can have an annular surface defining a portion of the port having the fourth diameter.

The port can have an annular surface beyond the position of the third diameter relative to the port opening that defines a portion of the port having a diameter smaller than the third diameter. In this case, the smaller diameter can be substantially equal to an inner diameter of the end of the conduit that is slidably inserted into the port.

According to another aspect of the invention, a coupling assembly is provided that comprises a component having a face that defines a port opening for a port that extends in an axial direction into the component. There is also a first interior surface defining a first portion of the port, a second interior surface defining a second portion of the port, and a third interior surface defining a third portion of the port. The first interior surface extends between the port opening and the second interior surface at a first angle relative to the axial direction. The second interior surface extends between the first interior surface and the third interior surface at a second angle relative to the axial direction, the second angle being larger than the first angle.

The coupling assembly also includes a conduit having an annular bead. An end of the conduit is slidably inserted into the port such that the end of the conduit is adjacent to the third interior surface and at least a portion of the annular bead is beyond the port opening. Also included is a seal extending around the conduit adjacent to the second interior surface.

The first angle is preferably in a range of 8.5 degrees to 15.5 degrees, and most preferably, the first angle is in a range from 11.5 degrees to 12.5 degrees. The second angle can be in a range 28–32 degrees, but this is not a critical range.

The third interior surface can extend in a direction somewhat parallel to the axial direction. The coupling assembly can also comprise a fourth interior surface that defines a fourth portion of the port that extends between the first interior surface and the port opening in a direction somewhat parallel to the axial direction.

In addition, the coupling assembly can further comprise an additional interior surface that defines a portion of the port, wherein the additional interior surface extends beyond the third interior surface relative to the port opening in a direction somewhat parallel to the axial direction. This additional interior surface can be a portion of the port having a diameter that is smaller than a diameter of a portion of the port defined by the third interior surface. For instance, the diameter of the portion of the port defined by this additional interior surface can be substantially equal to an internal diameter of the end of the conduit that is slidably inserted into the port.

According to another aspect of the invention, a coupling assembly is provided that comprises a component having a first interior surface defining a portion of a first passage that extends into the component in a first axial direction from a first aperture in an external surface of the component, and having a second interior surface defining a portion of a second passage that extends into the component in a second axial direction, somewhat parallel to the first axial direction, from a second aperture in the external surface of the component.

Each of the first and second interior surfaces includes a counterbored surface, a first beveled surface, a second beveled surface, and a parallel surface respectively positioned from the external surface of the component. The respective counterbored surface of each of the first and second interior surfaces is adjacent to the surface of the component. The respective first beveled surface of each of the first and second interior surfaces widens towards the external surface of the component at a respective first angle relative to the respective one of the first and second axial directions. The respective second beveled surface of each of the first and second interior surfaces widens towards the external surface of the component at a respective second angle relative to the respective one of the first and second axial directions. The respective parallel surface of each of the first and second interior surfaces extends somewhat parallel to the respective one of the first and second axial directions.

The coupling assembly further comprises a first conduit having a first conduit open end disposed within the first passage, and having a first conduit external surface adjacent to the first conduit open end and adjacent to the parallel surface of the first interior surface. The first conduit also has an annular bead adjacent to the counterbored surface of said first interior surface. The coupling assembly further comprises a second conduit having a second conduit open end disposed within the second passage, and having a second conduit external surface adjacent to the second conduit open end and adjacent to the parallel surface of said second interior surface. The second conduit also has an annular bead adjacent to the counterbored surface of said second interior surface.

The coupling assembly further comprises a first seal extending around the first conduit and adjacent to the first beveled surface of said first interior surface, and a second seal extending around the second conduit and adjacent to the first beveled surface of said second interior surface.

The coupling assembly can include an anchor plate slidably fitted onto the first and second conduits such that the anchor plate at least assists in holding the first and second conduits fixed in position relative to the component.

The first angle is preferably in a range of 8.5 degrees to 15.5 degrees, and most preferably, the first angle is in a range from 11.5 degrees to 12.5 degrees. The second angle can be in a range of 28–32 degrees, but this is not a critical range.

The component can be a component of an automotive air conditioning system, the conduits can be refrigerant lines, and the seals can be o-ring seals.

The first interior surface can include a second counterbored surface. The second counterbored surface can be adjacent to the parallel surface of the first interior surface on an end of the parallel surface further from the first aperture. The first interior surface could include a second parallel surface extending from the second counterbored surface away from the first aperture, the second parallel surface of the first interior surface defining a portion of the first interior surface having an internal diameter substantially equal to an internal diameter of the first conduit open end.

Also, the second interior surface could include a second counterbored surface, the second counterbored surface being adjacent to the parallel surface of the second interior surface on an end of the parallel surface further from the second aperture. The second interior surface could include a second parallel surface extending from the second counterbored surface of the second interior surface away from the second aperture. The second parallel surface of the second interior surface could define a portion of the second interior surface having an interior diameter substantially equal to an internal diameter of the second conduit open end.

BRIEF DESCRIPTION OF THE DRAWINGS

Two embodiments of the present invention will now be described by way of example only, with reference to the accompanying drawings in which.

DETAILED DESCRIPTION OF THE DRAWINGS

In the following detailed description of the preferred embodiments, reference is made to the accompanying drawings which form a part hereof, and in which are shown by way of illustration specific embodiments in which the invention may be made without departing from the scope of the present invention.

Figure 1:
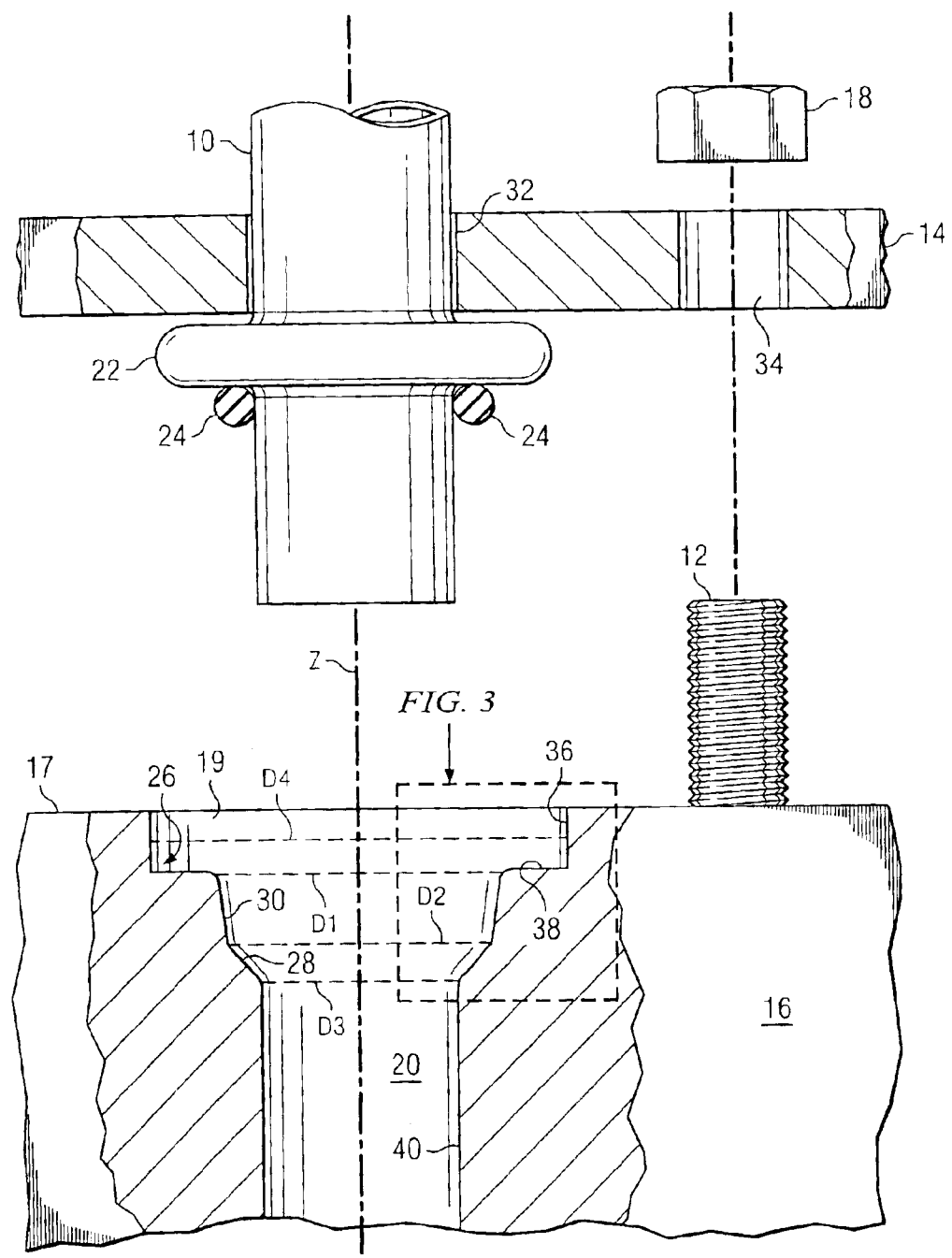
FIG. 1 is a partially-sectioned exploded view of a coupling assembly in accordance with the present invention.
Figure 2:
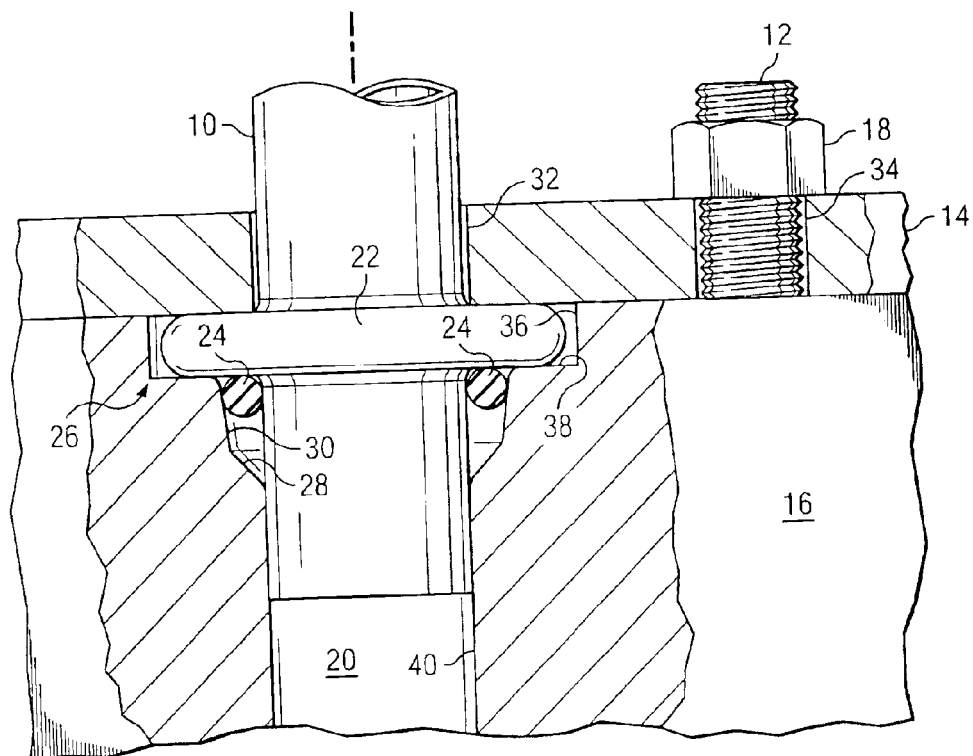
FIG. 2 is a view of the assembly as illustrated in FIG. 1, but assembled.

Referring first to FIGS. 1 and 2, an embodiment of a coupling assembly incorporating elements of the present invention is shown that includes a conduit 10, a threaded stud 12, an anchor plate 14, an A/C system component 16, and a hexagonal nut 18.

The conduit 10 is coupled with the component 16 of an automotive A/C system in order that a refrigerant can be moved between the conduit 10 and the component 16 without leaking. The component 16 has a surface 17 that defines a port opening 19 for a port 20 through which the refrigerant can be moved in or out of the component 16. In order to provide for fluid communication between the conduit 10 and the component 16, the conduit 10 is slidably inserted into the port 20. The conduit 10 has an annular bead 22 which comes to rest against a counterbored portion 26 of the port 20 as the conduit 10 is inserted into the port 20, thereby preventing the conduit 10 from being inserted into the port 20 any further. As shown in FIG. 2, an annular seal 24 is provided that extends coaxially around the conduit 10. Compression between the external side of the conduit 10, including the bead 22, and first and second beveled surfaces 28 and 30 of the port 20 causes the annular seal 24 to adapt itself to at least a portion of the space defined by these compressing surfaces. The compressed annular seal 24 is a key part of preventing leakage.

The anchor plate 14 has a first aperture 32 through which the conduit 10 extends. With the conduit 10 extending through the first aperture 32, the anchor plate 14 can slide along the conduit 10 into position against the surface 17 of the component 16. The anchor plate 14 also has a second aperture 34 through which the threaded stud 12 can slide as the anchor plate 14 is being positioned against the surface 17 of the component 16. Once the anchor plate 14 is positioned against the surface 17, a sufficient amount of the threaded stud 12 should protrude through the second aperture 34 to allow the hexagonal nut 18 to be properly threaded onto the stud 12.

Figure 3:
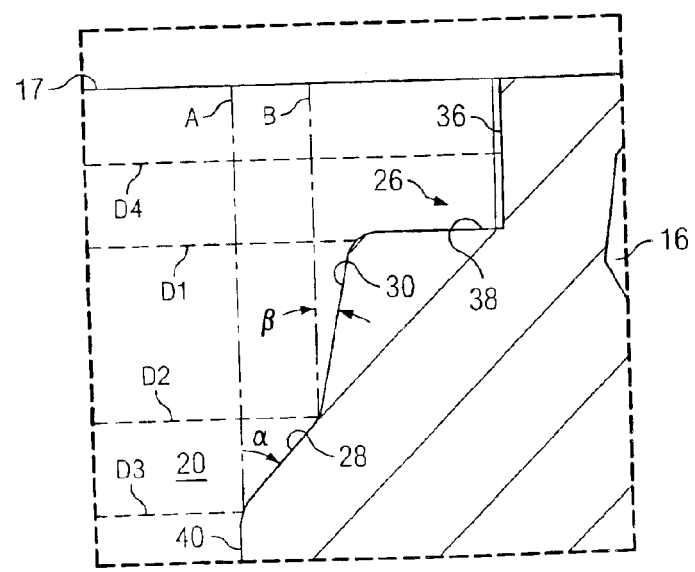
FIG. 3 is an enlarged view of a portion of FIG. 1.

Details of the port 20 will now be discussed with reference to FIGS. 1 and 3, where FIG. 3 provides an enlarged view of a portion of FIG. 1.

The port 20 extends in an axial direction into the component 16 along a longitudinal axis Z (shown in FIG. 1). In a preferred embodiment, the port 20 has a substantially circular cross-section when taken along a plane normal to the longitudinal axis Z. The broken lines in FIGS. 1 and 3 designated D1, D2, and D3 indicate positions of first, second, and third diameters, respectively, of the port 20. As shown in FIG. 3, the port 20 has a first beveled surface 28 that widens port 20 between the third diameter D3 and the second diameter D2. The port 20 also has a second beveled surface 30 that widens the port 20 between the second diameter D2 and the first diameter D1. The first beveled surface 28 widens the port 20 at an angle $\alpha$, and the second beveled surface 30 widens the port 20 at an angle $\beta$.

FIG. 3 also shows reference lines A and B, which are each substantially parallel to axis Z. Thus, the angle at which the first beveled surface 28 widens, designated as angle $\alpha$, can be measured between reference line A and the first beveled surface 28, and the angle at which the second beveled surface widens, designated as angle $\beta$, can be measured between reference line B and the second beveled surface 30. In the present embodiment, angle $\alpha$ is an angle in the range of 28 degrees to 32 degrees, preferably in the range of 29.5 degrees to 30.5 degrees. However, alternative embodiments of the present inventions can have any angle $\alpha$.

The angle $\beta$ is preferably an angle in the range of 8.5 degrees to 15.5 degrees, and most preferably in the range of 11.5 degrees to 12.5 degrees. The angle $\beta$ is related to the amount of compression experienced by the annular seal 24. If the angle $\beta$ is too large, the amount of compression experienced by the annular seal 24 will decrease to the point where the annular seal 24 cannot adequately prevent leakage. This is because as the angle $\beta$ increases, the annular seal 24 is allowed to drop further into the port 20. If the angle $\beta$ is increased too much, the annular seal 24 will eventually drop to the point where it cannot be clamped between the annular bead 22 and the second beveled surface 30. On the other hand, if the angle $\beta$ is too small, then the benefit provided by the present invention wherein the seal is reliably seated begins to diminish.

The counterbored portion 26 of the port 20 has an annular surface 36 that is somewhat parallel to axis Z and adjacent to the port opening 19. Along the annular surface 36 of the counterbored portion 26, the port 20 has a fourth diameter at broken line D4 in FIGS. 1 and 3. As shown in FIGS. 1 and 3, the fourth diameter D4 is larger than each of diameters D1, D2, and D3. The counterbored portion 26 of the port 20 also has an axial surface 38. However, it is preferable to provide a chamfered region between the beveled surface 30 and the counterbored portion 26 to reduce the likelihood of damage to the seal 24 during assembly. Therefore, depending on the chamfer dimension, the axial surface 38 can actually be a portion of a chamfer that extends between the beveled surface 30 and the annular surface 36.

The first beveled surface 28 narrows the port 20 towards a second annular surface 40 that extends into the component 16. The second annular surface 40 is substantially parallel to the axis Z.

As mentioned above, in order to provide for fluid communication between the conduit 10 and the component 16, the conduit 10 is slidably inserted into the port 20. As the conduit 10 is inserted into the port 20, the series of beveled surfaces described above serve to guide the conduit 10 into a somewhat coaxial relationship with the port 20. Since the annular seal 24 is coaxial to the conduit 10, the seal 24 becomes somewhat coaxial to the port 20 as well. It is preferable that the length of the conduit 10 from the bead 22 to the end being inserted into the port 20 be at least long enough to allow the seal 24 to be coaxial to the port 20 prior to reaching the position indicated by broken line D1.

The diameter at position D1 of the port 20 is preferably smaller than the outer diameter of the bead 22 in order to allow the bead 22 to serve as a means for preventing the conduit 10 from traveling too far into the port 20. However, the diameter at D1 is preferably large enough to allow at least a portion of the seal 24 to pass the position at line D1 and seat against the second beveled surface 30. Since the seal 24 bears against the second beveled surface 30 as the conduit 10 is being inserted into the port 20, the seal 24 tends to deform such that it lengthens somewhat coaxially with respect to the axis Z, conforming to at least a portion of the area bounded by the outer surface of the conduit 10, the bead 22, the second beveled surface 30, and the first beveled surface 28 as shown in FIG. 2. Since the seal 24 tends to deform such that it lengthens more in a coaxial direction than in a radial direction relative to the port 20, the risk of an extrusion is reduced.

As also shown in FIG. 2, the depth at which the conduit 10 can be inserted into the port 20 is limited since the bead 22 preferably bears against the counterbored portion 26. At the same time, this limits the amount of pressure the bead 22 can bear against the seal 24. This arrangement prevents damage to the seal 24 that could otherwise occur if the seal 24 was to bear the entire pressure exerted by the bead 22 with no limiting element.

Figure 4:
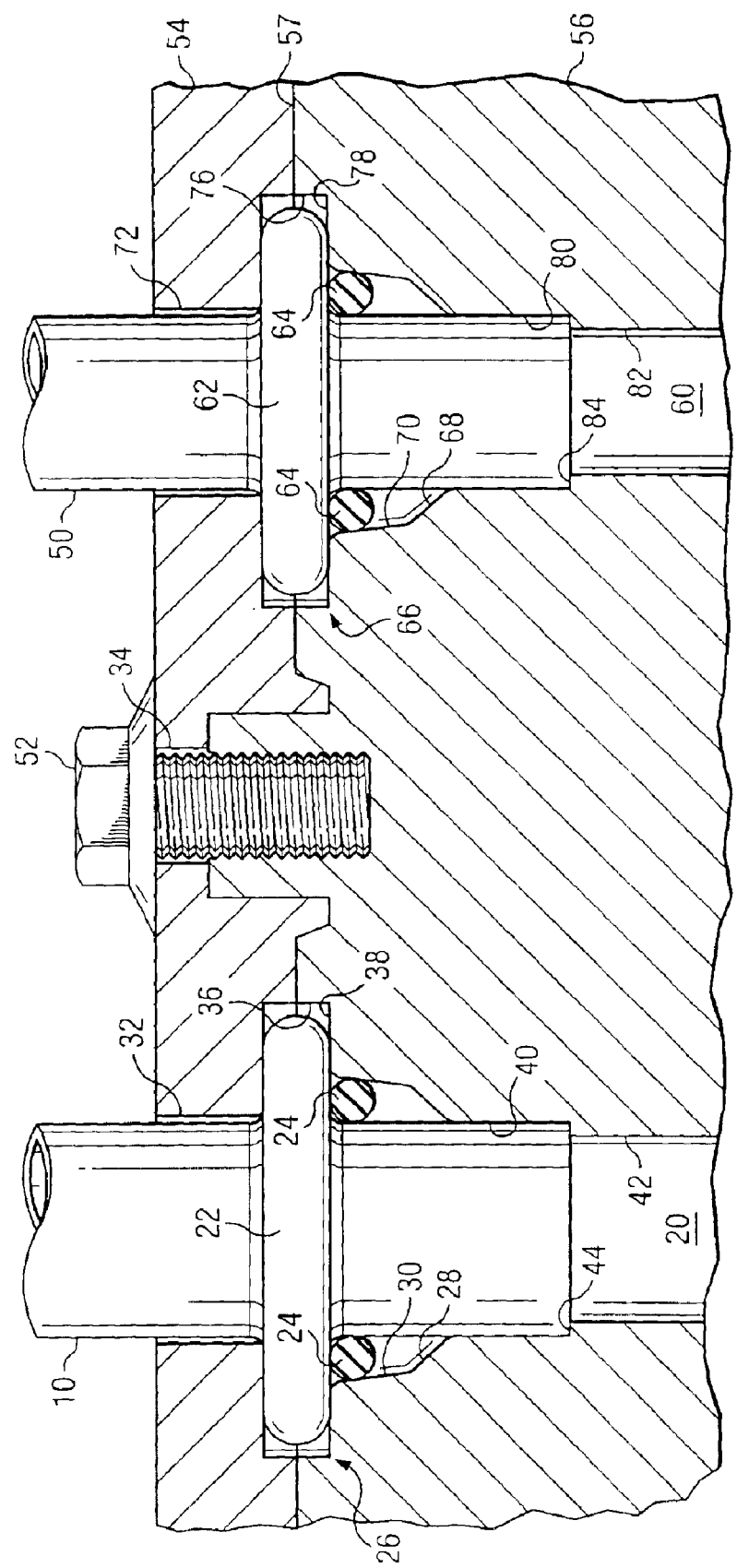
FIG. 4 is a partially-sectioned view of a second coupling assembly in accordance with the present invention.
Figure 5:
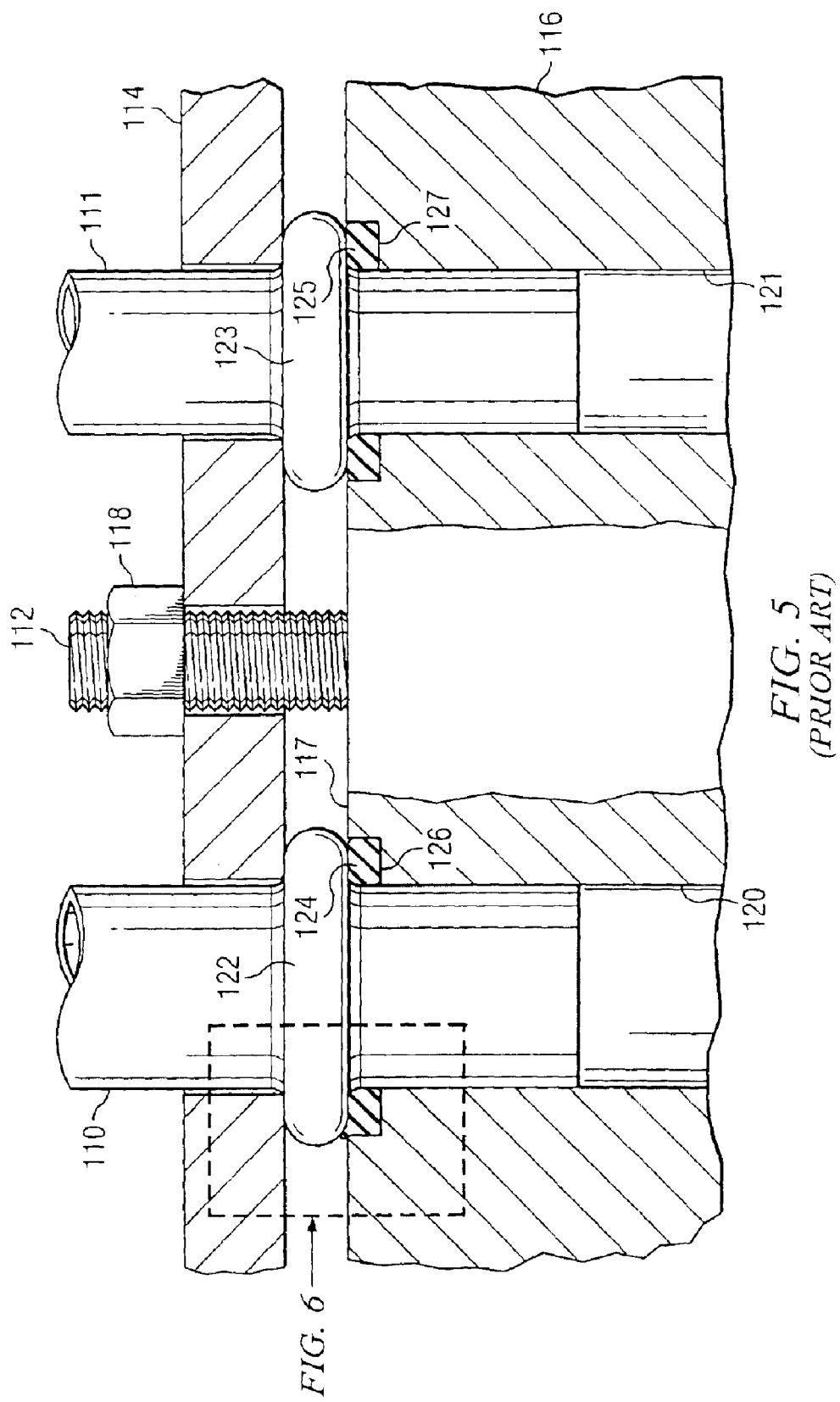
FIG. 5 is a partially-sectioned view of a prior art A/C connection.
Figure 6:
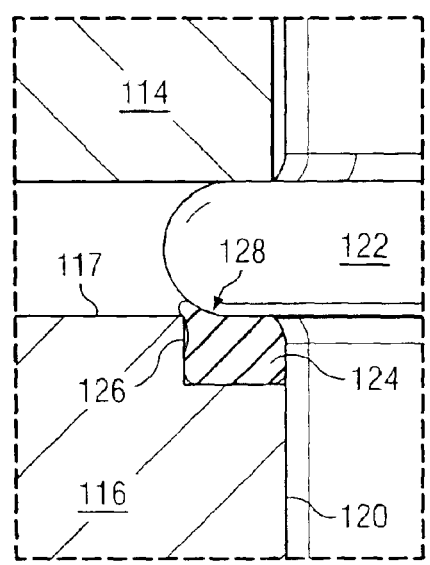
FIG. 6 is an enlarged view of a portion of FIG. 5.
Figure 7:
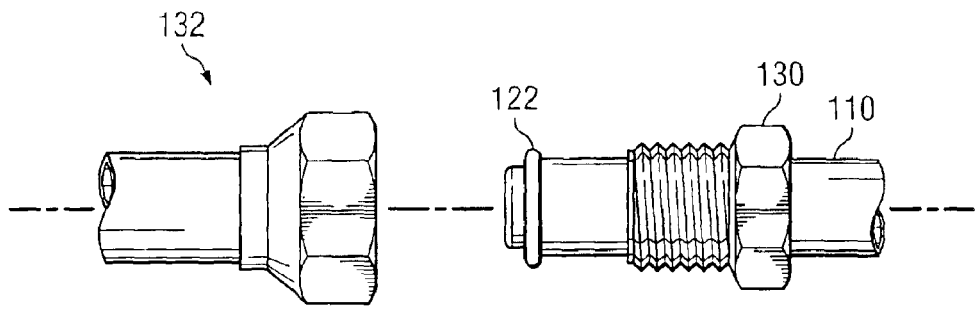
FIG. 7 is a plan view of a prior art connector.

In accordance with a second embodiment of the invention, FIG. 4 shows an arrangement for accommodating two parallel conduits 10 and 50. In the arrangement shown in FIG. 4, the conduit 10 has a larger diameter than the conduit 50, however this is not intended to be a limiting feature. The parallel conduits 10 and 50 are slidably inserted into parallel ports 20 and 60, respectively, of the component 56. The conduits 10 and 50 are held in the ports 20 and 60 by an anchor plate 54, which has an additional third aperture 72 as compared to the anchor plate 14 in order to accommodate the second conduit 50. The anchor plate 54 is held fixed to the component 56 with a bolt 52 that extends through the anchor plate 54 into the component 56.

As shown by the differing examples of connecting hardware (stud 12, hex nut 18, bolt 52) in the first and second embodiments, there are many known ways of securing an anchor plate to a component, any of which being acceptable without deviating from the spirit and scope of the present invention. However, it is preferable that a mounting method be used that allows the anchor plate to be detachable.

As shown in FIG. 4, the second conduit 50 includes an annular bead 62, and an annular seal 64 extends coaxially around the conduit 50. The description of the port 20 with reference to FIGS. 1–3 applies equally to first and second ports 20 and 60, with the second port 60 having a counterbored portion 66, a first beveled surface 68, a second beveled surface 70, an annular surface 76 of the counterbored portion 66, and an axial surface 78 of the counterbored portion 66.

In addition, in the second embodiment, the first and second ports 20 and 60 are provided with respective second counterbored portions 44 and 84. The first port 20 has a third annular surface 42 that extends from the counterbored portion 44 into the component 56, and the second port 60 has a third annular surface 82 that extends from the counterbored portion 84 into the component 56. The portion of the first port 20 defined by the third annular surface 42 has a smaller diameter than the portion of the first port 20 defined by the second annular surface 40. Likewise, the portion of the second port 60 defined by the third annular surface 82 has a smaller diameter than the portion of the second port 60 defined by the second annular surface 80.

Just as with the first embodiment, in the second embodiment the depth at which the conduits 10 and 50 can be inserted into the respective ports 20 and 60 is preferably limited when the beads 22 and 62 bear against the counterbored portions 26 and 76. However, the second counterbored portions 44 and 84 of the second embodiment provide a back-up depth-limiting means for limiting the amount of pressure the beads 22 and 62 can bear against the respective annular seals 24 and 64 in the event the first counterbored portions 26 and 76 are insufficient.

Another advantage of the counterbored portions 44 and 84 is that the diameters of the portions of the ports 20 and 60 defined by the respective annular surfaces 42 and 82 can be made substantially the same as the inner diameters of the conduits 10 and 50. This would result in a reduction of turbulence at the point where fluid moves between the ports 20 and 60 and the respective conduits 10 and 50. Such a reduction in turbulence is desirable, since less turbulence means more fluid can move more efficiently through the system.

According to a third embodiment of the present invention, only one of the two ports 20 and 60 shown in FIG. 4 is provided with a second counterbored portion 44, 84. In other words, one of the two ports 20 and 60 would be replaced with the port 20 of the first embodiment.

It is envisioned that the coupling assembly disclosed herein could be used in a wide variety of applications other than automotive air-conditioning systems without deviating from the spirit and scope of the present invention. It is also envisioned that conduits and ports can be used that have non-circular cross-sections.

While endeavoring in the foregoing specification to draw attention to those features of the invention believed to be of particular importance, it should be understood that the Applicant claims protection in respect of any patentable feature, or combination of features, hereinbefore referred to and/or shown in the drawings, whether or not particular emphasis has been placed thereon.

What is claimed is:

1. A coupling assembly comprising:
    a component having a surface, the surface defining a port opening for a port which extends into the component,
    wherein the port has first, second, and third diameters, which are at respective positions from closer to the port opening to further inside the port, the first diameter being larger than the second diameter and the third diameter being smaller than the second diameter, and
    wherein the port widens at an angle α between the third diameter and the second diameter, and the port widens at an angle β between the second diameter and the first diameter, the angle α being different than the angle β;

a conduit having an annular bead, wherein an end of the conduit can be slidably inserted into the port such that the end of the conduit extends beyond the position of the third diameter and at least a portion of the annular bead extends beyond the port opening; and a seal extending around the conduit between the annular bead and the position of the third diameter.

2. A coupling assembly as claimed in claim 1, wherein the angle α is larger than the angle β.

3. A coupling assembly as claimed in claim 2, wherein the angle α is in a range from 28 degrees to 32 degrees.

4. A coupling assembly as claimed in claim 2, wherein the angle β is in a range from 8.5 degrees to 15.5 degrees.

5. A coupling assembly as claimed in claim 4, wherein the angle β is in a range from 11.5 degrees to 12.5 degrees.

6. A coupling assembly as claimed in claim 1, wherein the port has a fourth diameter at a position between the first diameter and the port opening, wherein the fourth diameter is larger than the first diameter.

7. A coupling assembly as claimed in claim 6, wherein the port has an annular surface defining a portion of the port having the fourth diameter.

8. A coupling assembly as claimed in claim 7, wherein the angle β is in a range from 8.5 degrees to 15.5 degrees.

9. A coupling assembly as claimed in claim 8, wherein the angle β is in a range from 11.5 degrees to 12.5 degrees.

10. A coupling assembly as claimed in claim 1, further comprising a secondary port opening for a secondary port which extends into the component, wherein the secondary port has first, second, and third secondary-port diameters, which are at respective positions from closer to the secondary port opening to further inside the secondary port, the first secondary-port diameter being larger than the second secondary-port diameter and the third secondary-port diameter being smaller than the second secondary-port diameter, wherein the secondary port widens at said angle α between the third secondary-port diameter and the second secondary-port diameter, and the secondary port widens at said angle β between the second secondary-port diameter and the first secondary-port diameter.

11. A coupling assembly as claimed in claim 10, wherein at least a portion of said port and said secondary port extend somewhat in parallel into the component from said face.

12. A coupling assembly as claimed in claim 10, wherein the secondary port has a fourth secondary-port diameter at a position between the first secondary-port diameter and the secondary port opening, wherein the fourth secondary-port diameter is larger than the first secondary-port diameter, and wherein the secondary port has an annular surface defining a portion of the secondary port having the fourth secondary-port diameter.

13. A coupling assembly as claimed in claim 12, wherein the first, second, third, and fourth diameters of the port are larger than the first, second, third, and fourth secondary-port diameters of the secondary port, respectively.

14. A coupling assembly as claimed in claim 1, wherein the port has an annular surface further inside the port than the position of the third diameter, the annular surface defining a portion of the port having a fourth diameter smaller than said third diameter.

15. A coupling assembly as claimed in claim 14, wherein the fourth diameter is substantially equal to an inner diameter of the end of said conduit that can be slidably inserted into the port.

16. A coupling assembly comprising:

a component face defining a port opening for a port that extends in an axial direction into the component, a first interior surface defining a first portion of the port;

a second interior surface defining a second portion of the port;

a third interior surface defining a third portion of the port, wherein the first interior surface extends between the port opening and the second interior surface at a first angle relative to the axial direction, and wherein the second interior surface extends between the first interior surface and the third interior surface at a second angle relative to the axial direction, the second angle being larger than the first angle;

a conduit having an annular bead, wherein an end of the conduit can be slidably inserted into the port such that the end of the conduit is adjacent to said third interior surface and at least a portion of the annular bead extends beyond the port opening; and a seal extending around the conduit adjacent to said first interior surface.

17. A coupling assembly as claimed in claim 16, wherein the second angle is in a range from 28 to 32 degrees.

18. A coupling assembly as claimed in claim 17, wherein the first angle is in a range from 8.5 degrees to 15.5 degrees.

19. A coupling assembly as claimed in claim 18, wherein the first angle is in a range from 11.5 degrees to 12.5 degrees.

20. A coupling assembly as claimed in claim 16, wherein the third interior surface extends in a direction somewhat parallel to the axial direction.

21. A coupling assembly as claimed in claim 20, further comprising a fourth interior surface defining a fourth portion of the port, wherein the fourth interior surface extends between the first interior surface and the port opening in a direction somewhat parallel to the axial direction.

22. A coupling assembly as claimed in claim 21, wherein the first angle is in a range from 8.5 degrees to 15.5 degrees.

23. A coupling assembly as claimed in claim 22, wherein the first angle is in a range from 11.5 degrees to 12.5 degrees.

24. A coupling assembly as claimed in claim 16, further comprising a secondary port opening for a secondary port that extends in a second axial direction into the component, a first secondary-port interior surface defining a first portion of the secondary port;

a second secondary-port interior surface defining a second portion of the secondary port; and a third secondary-port interior surface defining a third portion of the secondary port, wherein the first secondary-port interior surface extends between the secondary port opening and the second secondary-port interior surface at said first angle relative to the second axial direction, and wherein the second secondary-port interior surface extends between the first secondary-port interior surface and the third secondary-port interior surface at said second angle relative to the second axial direction.

25. A coupling assembly as claimed in claim 24, wherein said axial direction and said second axial direction are somewhat parallel to each other.

26. A coupling assembly as claimed in claim 24, further comprising a fourth secondary-port interior surface defining a fourth portion of the secondary port, wherein the fourth secondary-port interior surface extends between the first secondary-port interior surface and the secondary port opening in a direction somewhat parallel to the second axial direction.

27. A coupling assembly as claimed in claim 16, further comprising a fourth interior surface defining a fourth portion of the port, wherein the fourth interior surface extends beyond the third interior surface relative to the port opening in a direction somewhat parallel to the axial direction, the fourth interior surface defining a portion of the port having a diameter that is smaller than a diameter of a portion of the port defined by the third interior surface.

28. A coupling assembly as claimed in claim 27, wherein the diameter of the portion of the port defined by the fourth interior surface is substantially equal to an internal diameter of the end of said conduit that can be slidably inserted into the port.

29. A coupling assembly comprising:
  a component having a first interior surface defining a portion of a first passage that extends into the component in a first axial direction from a first aperture in an external surface of the component, and having a second interior surface defining a portion of a second passage that extends into the component in a second axial direction, somewhat parallel to the first axial direction, from a second aperture in the external surface of the component,
  wherein each of the first and second interior surfaces includes a counterbored surface, a first beveled surface, a second beveled surface, and a parallel surface respectively positioned from the external surface of the component,
  wherein the respective counterbored surface of each of the first and second interior surfaces is adjacent to the external surface of the component,
  wherein the respective first beveled surface of each of the first and second interior surfaces widens towards the external surface of the component at a respective first angle relative to the respective one of the first and second axial directions,
  wherein the respective second beveled surface of each of the first and second interior surfaces widens towards the external surface of the component at a respective second angle relative to the respective one of the first and second axial directions, and
  wherein the respective parallel surface of each of the first and second interior surfaces extends somewhat parallel to the respective one of the first and second axial directions,
  a first conduit having a first conduit open end disposed within the first passage, and a first conduit external surface adjacent to the first conduit open end, the first conduit external surface being adjacent to the parallel surface of said first interior surface, and having a first conduit annular bead adjacent to the counterbored surface of said first interior surface;
  a second conduit having a second conduit open end disposed within the second passage, and a second conduit external surface adjacent to the second conduit open end, the second conduit external surface being adjacent to the parallel surface of said second interior surface, and having a second conduit annular bead adjacent to the counterbored surface of said second interior surface;
  a first seal extending around the first conduit and adjacent to the first beveled surface of said first interior surface; and
  a second seal extending around the second conduit and adjacent to the first beveled surface of said second interior surface.

30. A coupling assembly as claimed in claim 29, further comprising an anchor plate slidably fitted onto the first and second conduits such that the anchor plate at least assists in holding the first and second conduits fixed in positions relative to the component.

31. A coupling assembly as claimed in claim 29, wherein the first angle is in a range from 8.5 degrees to 15.5 degrees.

32. A coupling assembly as claimed in claim 31, wherein the first angle is in a range from 11.5 degrees to 12.5 degrees.

33. A coupling assembly as claimed in claim 29, wherein the component is a component of an automotive air-conditioning system.

34. A coupling assembly as claimed in claim 33, wherein the conduits are refrigerant lines.

35. A coupling assembly as claimed in claim 34, wherein the seals are o-ring seals.

36. A coupling assembly as claimed in claim 29, wherein the first interior surface includes a second counterbored surface, the second counterbored surface being adjacent to the parallel surface of the first interior surface on an end of the parallel surface further from the first aperture.

37. A coupling assembly as claimed in claim 36, wherein the first interior surface includes a second parallel surface extending from the second counterbored surface away from the first aperture, the second parallel surface of the first interior surface defining a portion of the first interior surface having an internal diameter substantially equal to an internal diameter of the first conduit open end.

38. A coupling assembly as claimed in claim 37, wherein the second interior surface includes a second counterbored surface, the second counterbored surface being adjacent to the parallel surface of the second interior surface on an end of the parallel surface further from the second aperture, wherein the second interior surface includes a second parallel surface extending from the second counterbored surface of the second interior surface away from the second aperture, the second parallel surface of the second interior surface defining a portion of the second interior surface having an interior diameter substantially equal to an internal diameter of the second conduit open end.

39. An apparatus for coupling to a conduit having an annular bead disposed at a distance from an end of said conduit and having a seal disposed around the conduit adjacent to said annular bead, the apparatus comprising:
  an exterior surface including an opening that defines a port extending into the apparatus;
  a first interior surface disposed proximal to the exterior surface such that the seal is in contact with the first interior surface when the apparatus and conduit are coupled together, the first surface comprising an annular bevel having a first bevel angle relative to an axis of the port;
  a second interior surface disposed distal to the first surface, the second surface comprising an annular bevel having a second bevel angle relative to the axis of the port, the second bevel angle being larger than the first bevel angle; and
  a third interior surface disposed distal to the second surface such that the end of the conduit is juxtaposed adjacent to the third surface when the apparatus and conduit are coupled together, thereby providing fluid communication between an interior portion of the conduit and an interior portion of the apparatus.

* * * * *